(12) United States Patent
Ehrlich et al.

(10) Patent No.: US 7,110,209 B2
(45) Date of Patent: Sep. 19, 2006

(54) SYSTEMS AND METHODS FOR EFFICIENT WRITING OF LOW-RRO PHASE-BURST SERVO PATTERNS

(75) Inventors: Richard M. Ehrlich, Saratoga, CA (US); Maxim Roth, Cupertino, CA (US); David Rutherford, San Jose, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/090,607

(22) Filed: Mar. 25, 2005

(65) Prior Publication Data

US 2006/0132962 A1 Jun. 22, 2006

Related U.S. Application Data

(60) Provisional application No. 60/638,657, filed on Dec. 22, 2004.

(51) Int. Cl.
*G11B 5/596* (2006.01)

(52) U.S. Cl. .................. 360/77.08; 360/51; 360/75; 360/77.04

(58) Field of Classification Search .................. None
See application file for complete search history.

(56) References Cited

U.S. PATENT DOCUMENTS 6,738,205 B1 * 5/2004 Moran et al. ............. 360/17

* cited by examiner

*Primary Examiner*—K. Wong
(74) *Attorney, Agent, or Firm*—Fliesler, Meyer LLP

(57) ABSTRACT

The minor coherence-errors suffered during servowriting of bursts in a phase burst servo pattern may contribute to significant written-in runout of the resulting pattern. Embodiments of the present invention enables the servowriting of both the zig/zag bursts and/or the digital information of the phase burst pattern all in one single revolution so that the common coherence errors of the zig/zag bursts can be canceled during demodulation. Such single pass servowriting of both zig/zag bursts can be accomplished by either using additional phase-adjustment circuitry or by shifting the phase of the write clock to allow servowriting of the bursts and/or digital information all at edges of (different) integer clock cycles. This description is not intended to be a complete description of, or limit the scope of, the invention. Other features, aspects, and objects of the invention can be obtained from a review of the specification, the figures, and the claims.

20 Claims, 19 Drawing Sheets

SYSTEMS AND METHODS FOR EFFICIENT WRITING OF LOW-RRO PHASE-BURST SERVO PATTERNS

CLAIM OF PRIORITY

This application claims priority from the following application, which is hereby incorporated by reference in its entirety:

U.S. Provisional Patent Application No. 60/638,657, entitled SYSTEMS AND METHODS FOR EFFICIENT WRITING OF LOW-RRO PHASE-BURST SERVO PATTERNS by Richard M. Ehrlich, filed Dec. 22, 2004.

FIELD OF THE INVENTION

The present invention relates to servowriting processes, systems, and devices.

BACKGROUND

Advances in data storage technology have provided for ever-increasing storage capability in devices such as DVD-ROMs, optical drives, and disk drives. In hard disk drives, for example, the width of a written data track has decreased due in part to advances in reading, writing, and positioning technologies. More narrow data tracks result in higher density drives, which is good for the consumer but creates new challenges for drive manufacturers. As the density of the data increases, the tolerance for error in the position of a drive component such as a read/write head decreases. As the position of such a head relative to a data track becomes more important, so too does the placement of information, such as servo data, that is used to determine the position of a head relative to a data track.

In existing self-servowriting techniques, servo-bursts of a phase-burst scheme must be written in separate passes (one per burst). Because of this, minor coherence-errors suffered during writing of the bursts contribute to significant written-in runout of the resulting pattern. The resulting written-in runout may be un-acceptable.

DETAILED DESCRIPTION

Figure 1:
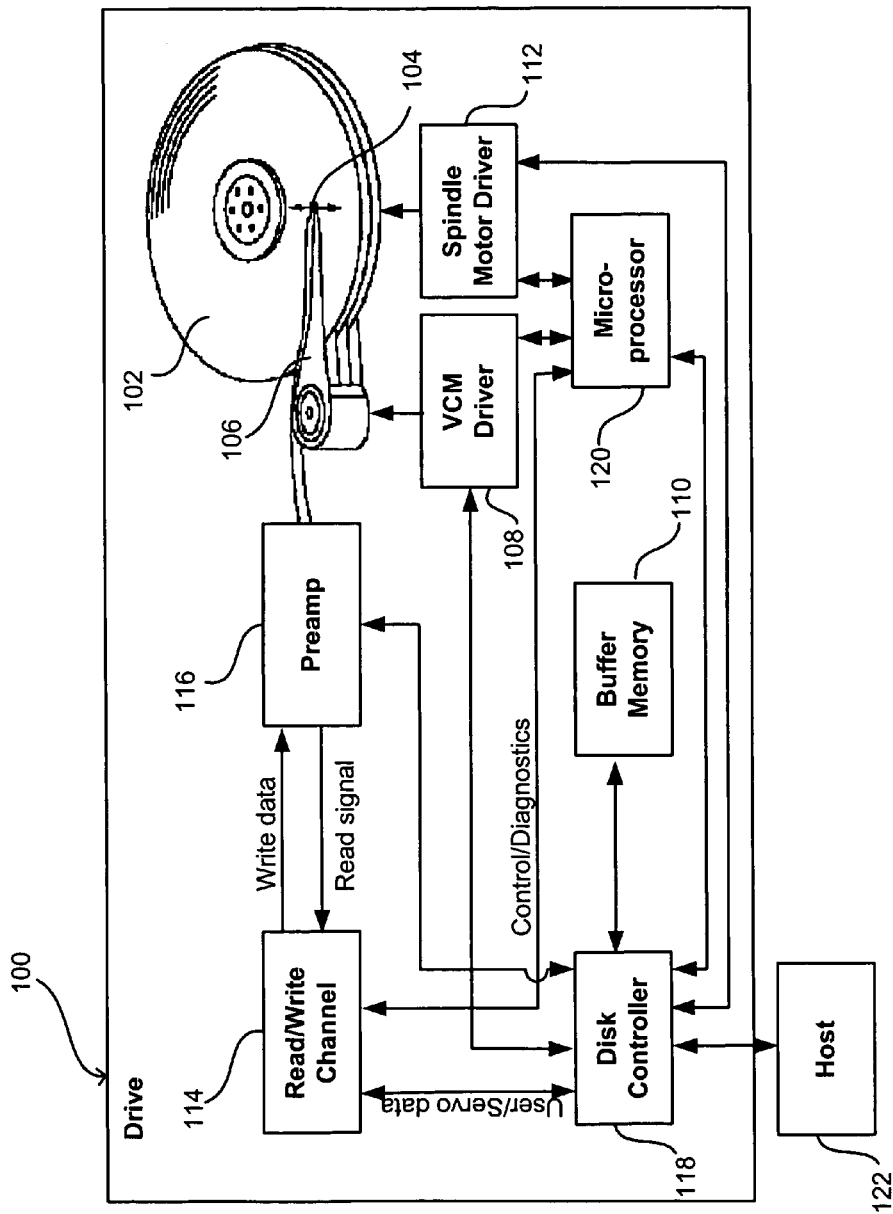
FIG. 1 is a functional diagram showing components of a disk drive that can be used in accordance with embodiments of the present invention.

Systems and methods in accordance with various embodiments of the present invention can be used when servowriting, or self-servowriting, a rotatable storage medium in a data storage device, such as a hard disk drive. For example, a typical disk drive 100, as shown in FIG. 1, includes at least one magnetic disk 102 capable of storing information on at least one of the surfaces of the disk. A closed-loop servo system can be used to move an actuator arm 106 and data head 104 over the surface of the disk, such that information can be written to, and read from, the surface of the disk. The closed-loop servo system can contain, for example, a voice coil motor driver 108 to drive current through a voice coil motor (not shown) in order to drive the actuator arm, a spindle motor driver 112 to drive current through a spindle motor (not shown) in order to rotate the disk(s), a microprocessor 120 to control the motors, and a disk controller 118 to transfer information between the microprocessor, buffer memory 110, read channel 114, and a host 122. A host can be any device, apparatus, or system capable of utilizing the data storage device, such as a personal computer or Web server or consumer electronics device. The drive can contain at least one processor, or microprocessor 120, that can process information for the disk controller 118, read/write channel 114, VCM driver 108, or spindle driver 112. The microprocessor can also include a servo controller, which can exist as an algorithm resident in the microprocessor 120. The disk controller 118, which can store information in buffer memory 110 resident in the drive, can also provide user data to a read/write channel 114, which can send data signals to a current amplifier or preamp 116 to be written to the disk(s) 102, and can send servo and/or user data signals back to the disk controller 118. A controller for the data storage device can include the disk controller 128 and/or processor 120. The controller can be on one or multiple chips. In one embodiment, a controller chip contains SRAM while DRAM and FLASH are external to the chip. Other memory arrangements can also be used.

Figure 2:
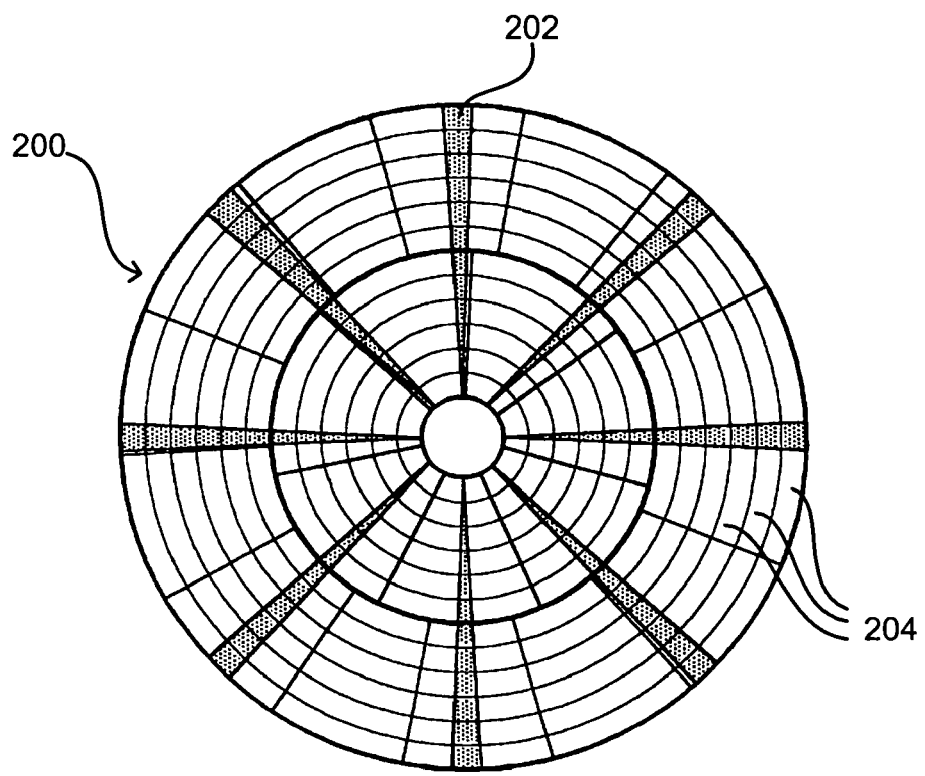
FIG. 2 is a diagram showing an example of a data and servo format for a disk in the drive of FIG. 1.

The information stored on disks can be written in concentric tracks, extending from near the inner diameter (ID) of the disk to near the outer diameter (OD) of the disk 200, as shown in the example disk of FIG. 2. In an embedded servo-type system, servo information can be written in servo wedges 202, and can be recorded on tracks 204 that can also contain data. In a system where the actuator arm rotates about a pivot point such as a bearing, the servo wedges may not extend linearly from the inner diameter of the disk to the outer diameter, but may be curved slightly in order to adjust for the trajectory of the head as it sweeps across the disk.

The servo information often includes bursts of transitions called "servo bursts". A boundary or burst boundary as used herein does not mean or imply that servo bursts forming a boundary necessarily have a substantially common edge as the bursts can be spaced such that there is a gap radially or circumferentially between the bursts. The servo information can be positioned regularly about each track, such that when a data head reads the servo information, a relative position of the head can be determined that can be used by a servo processor to adjust the position of the head relative to the track. For each servo wedge, this relative position can be determined in one example as a function of the target location, a track number read from the servo wedge, and the amplitudes and/or phases of the bursts, or a subset of those bursts. The number of bursts present in a servo wedge can vary from design to design, ranging from as few as one to as many as 6 or even more bursts in a single wedge. The position of a head or element, such as a read/write head or element, relative to a target or desired location such as the center of a track or other desired location, will be referred to herein as position-error. Position-error distance may be used to refer to the distance between a target or desired location and an actual or predicted location of a head or element. The signal generated as a head or element moves across servo bursts or boundaries between servo bursts is often referred to as a position-error signal (PES). The PES can be used to represent a position of the head or element relative to a target location such as a track centerline defined by a mathematical relationship between the amplitudes and/or phases of all of or any subset of the servo bursts.

Figure 3:
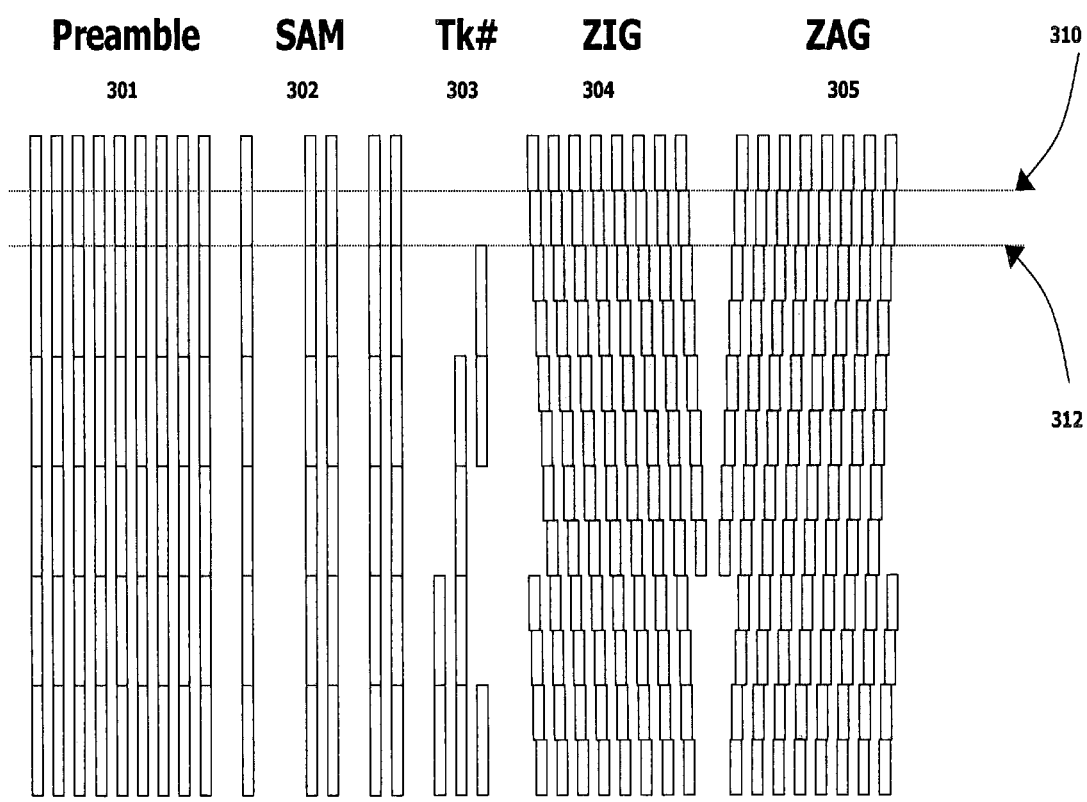
FIG. 3 is a diagram showing one example of servo information that can be written to the tracks shown in FIG. 2.

One example of a servo pattern is shown in FIG. 3. That figure shows a radial extent of several servo tracks, and a circumferential extent of a single wedge. The shaded areas represent magnetic media that is magnetized in one direction, and the un-shaded areas represent magnetic media that is magnetized in another direction (typically opposite to that of the shaded regions). In a longitudinal-recording system, the directions would be in the positive and negative circumferential directions (to the right and left in the figure). In a perpendicular-recording system, the two directions would be perpendicular to the media (in and out of the page in the figure). Both recording systems (longitudinal and perpendicular) can benefit from this invention.

Although the read-write head (often referred as a "R/W head") typically stands relatively still while reading and writing data, while the disk moves underneath it, it is often useful to visualize the head passing by regions of the disk as it reads or writes data from or to the disk. In the case of the servo patterns shown in FIG. 3, the head would first encounter the left-most patterns and move to the right across the servo-wedge (while of course, in reality, it is the head that stands still while the servo-pattern on the disk moves to the left). The R/W head first encounters the preamble 301, which is intended to allow the channel to acquire the correct sampling phase and amplification of the servo signal. Next, the R/W head encounters a SAM 302, or "Servo Address Mark". The SAM serves as a timing-mark, relative to which all subsequent information in the servo wedge can be located. Successful identification of the SAM also serves as an indication to the R/W channel that servo demodulation is proceeding properly. After the SAM, a servo wedge typically contains digital information about the radial and/or circumferential location of the wedge. In FIG. 3, a short track-number 303 is shown. The track-number typically specifies the general radial location of the wedge. Track-numbers are typically numbered sequentially, increasing either from ID (Inner-Diameter) to OD (Outer-Diameter), or vice-versa. The track-number shown in FIG. 3 contains only 4 bits, and can thus uniquely identify only 16 different tracks. Since a modern disk-drive may contain anywhere from 25000 to well over 100000 tracks, many more than 4 bits may be necessary to identify the track-number. FIG. 3 contains very few track-number bits primarily to allow easy illustration of a servo wedge. The track-number in a servo wedge is typically Gray-coded. Gray-coding of the track-number, as is known to those skilled in the art, ensures that only one bit of the gray-coded value changes from one track to the next. Thus, if the R/W head is between two tracks (as it often is), only one bit of the demodulated track-number might be indeterminate or ambiguous. A robust servo-demodulation scheme can deal with one ambiguous track-number bit.

It is important to note that the track-number identified by the track-number field is a servo-track-number (used, among other fields, by the servo to determine the radial location of the R/W head), which may be different from a data-track-number (which is used to identify a particular track of user-data). In some drives, there is a one-to-one correspondence between servo-tracks and data-tracks (that is, a given data-track may be associated with a servo-track of the same number, or a servo-track whose track-number is simply offset by a constant value from that of the data-track number). In other drives, a data-track may occupy a larger radial extent than that of a servo-track. A popular embodiment involves a ratio of 3/2 between data tracks and servo tracks. In such an embodiment, each data-track occupies the radial extent of 1.5 servo tracks. The translation from a requested data-track location to the corresponding servo track location for such a system might then be servoTrack= (1.5*dataTrack)+offsetTrack, where dataTrack is the requested data-track, servoTrack is the corresponding servo-track, and offsetTrack is an offset which can be used to place data-track #0 beyond servo-track #0 (typically, to allow the servo to safely operate slightly outside of the user data region). An example of such an embodiment is found in U.S. Pat. No. 5,600,506, by Baum et al., entitled "Apparatus and method for determining the position of a transducer relative to a disk surface in a disk drive system", which is incorporated herein by reference. It is also possible for a disk drive to use other relationships between servo and data tracks. One example of such a system can be found in U.S. Pat. No. 6,052,250, by Golowka et al., entitled "Disk drive with separately determined servo and data track pitch", incorporated herein by reference.

The servo pattern of FIG. 3 does not show any wedge-number. Typically, a servo wedge will have at least some indication of the circumferential location of the wedge, either in the form of a wedge-number included in each wedge, or an "index-mark", which identifies a single wedge out of all of the wedges of a track as an "index-wedge", or wedge #0. Wedges are typically numbered form 0 to N−1 (where N is the total number of servo-wedges on a track) going around the track in the order of encounter of wedges by the R/W head. This practice is well known to one of ordinary skill in the art. The wedge-number and/or index-mark are left out of the figures in this document to simplify the figures.

After the digital information, the head encounters two servo bursts, labeled "zig" 304 and "zag" 305, which provide information about the fractional-track radial position of the R/W head. That fractional-track information can be combined with servo-track-number information of the wedge to determine the total radial position of the R/W head with great resolution. As discussed above, the fractional track position can determined as a function of the amplitudes and/or phases of any combination of bursts in the servo wedge. For the embodiment shown in FIG. 3, the radial position information is determined from the phases of the two bursts in the wedge. Specifically, the relative phases of the two bursts are estimated via DFT (Discrete-Fourier Transform) processing of digitized, filtered samples of the signal from the R/W head as it passes over the bursts. As can be seen in FIG. 3, the individual transitions of the first burst 304 are more delayed as one moves down the page (which, for concreteness, will be assumed here to represent motion towards the OD of the disk), while the transitions of the second burst 305 are less delayed as one moves down the page. Thus the phase-difference (the phase of the first burst 304 minus that of the second one 305) decreases with motion down the page in FIG. 3.

When decoding phase bursts, a drive system can use an algorithm that takes an arc tangent of the real and imaginary parts of a discrete Fourier transform (DFT) of the burst signal. Existing channels are capable of sampling the signal and doing a discrete Fourier transform. One such discrete Fourier transform that can be used is given as follows:

$$F_k = \sum_{n=0}^{N-1} f_n e^{-j2\pi k \frac{n}{N}}$$

Figure 14A:
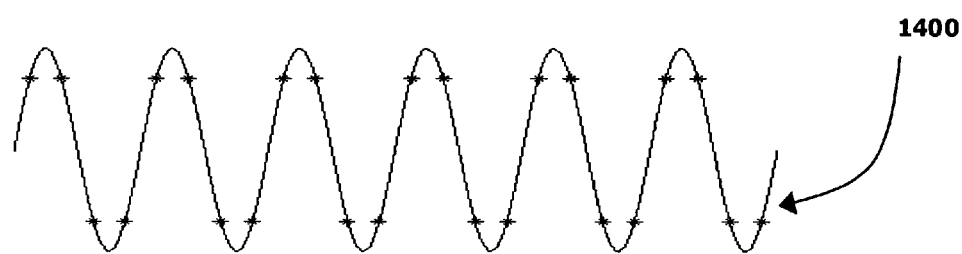
FIGS. 14A–B show possible sampling locations for DFT processing of servo signals.
Figure 14B:
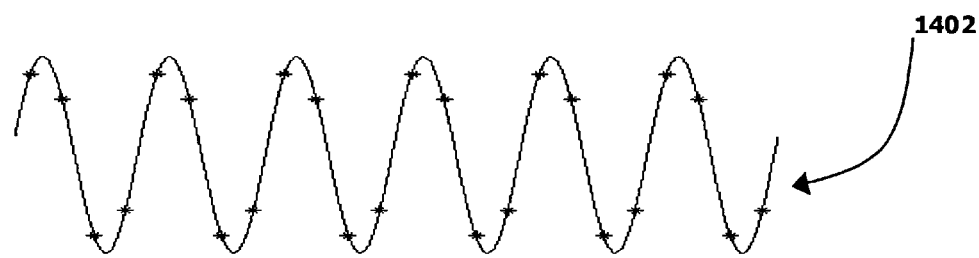

In this equation, $f_n$ is the sequence in time and $F_k$ is the Fourier component in frequency space. This "complex" math can be simplified in at least a few situations. For example, a signal can be examined at one quarter of the sample rate. In that case, the frequency-index, k, of interest would be k=M where M is the number of (approximately) sinewave cycles processed for each burst. For example, if the servo burst was 8 complete cycles in length (as is the case in FIG. 3), then a servo demodulation system might observe the middle 6 cycles (in order to avoid end-effects of the signal). In that case, the frequency-index of interest for the DFT of each burst signal would be k=6, so the above equation would be applied to determine the complex quantity, $F_6$. These samples can be taken at any appropriate location or interval, such as at or between signal peaks, etc. FIGS. 14A and 14B show example burst-signals with two different phases, relative to sample-times (each of which is marked with an "*" in those figures). The signal in FIG. 14B is slightly phase-advanced, relative to the one in FIG. 14A. Even though the two signals are of the same amplitude, the difference in phases is reflected in the different resulting sample-values. Since the signals 1400 and 1402 are examined at one quarter the sample rate, as shown in the figures, the DFT coefficients are all either +1, 0, or −1. In this case, the real part of the Fourier transform multiplies the signal by +1, 0, −1, 0, . . . and the imaginary part multiplies the signal by 0, +1, 0, −1 . . . , the imaginary part being offset by one sample from the real part. Therefore, each sample is adding to, subtracting from, or not affecting the result. An alternative approach is to use coefficients of +1, −1, −1, and +1 for the real part, and +1, +1, −1, −1 for the imaginary part, which can provide for greater immunity to noise since all samples will contribute to the sum. The resulting DFTs will all be phase-shifted by π/4 radians, relative to DFTs obtained using the +1, 0, −1, 0 (real part) and 0, +1, 0, −1 (imaginary) coefficients, but as long as only phase-differences between bursts are used, this will not alter the resulting demodulated position. The discrete Fourier transform can then be reduced to an "adder" with no multiplication. A discrete Fourier transform of the signal then can be broken down into real and imaginary parts. A four-quadrant arc-tangent function can then be used to determine the phase, $\phi$, as shown below:

$$\phi = \tan^{-1}(\sin(\phi), \cos(\phi)) = \tan^{-1}(Re\{F_k\}, Im\{F_k\})$$

where $\sin(\phi)$ is the imaginary portion of the above-referenced DFT, $F_k$, at the fundamental servo frequency, and $\cos(\phi)$ is the real part. The four-quadrant arc-tangent function, written as "$\tan^{-1}(\ )$" above, is referred to as "atan2( )" in many computational languages (such as Fortran and Matlab, which are well known to those of skill in the art). Using the phase, the system can determine the radial position as described below.

In the phase-burst pattern of FIG. 3, the phase of the ZIG-burst 304 is delayed by 45 degrees (or π/4 radians) from one servowriting-step to the one below it, where 360 degrees (or 2π radians) represents one (approximately) sinewave cycle of the signal. The ZAG-burst 305 phase is advanced by the same angle for each successive lower servowriting step. There are many other options for the amount of phase-change per servowriting-step for both the ZIG and ZAG bursts, both larger and smaller amounts per servowriting-step (or even opposite directions of phase-change for both), but this particular value lends itself to a simple algorithm for combination of the demodulated (and de-Gray-coded) track-number and the burst-phase difference. The difference between the phases of the two bursts, $\Delta\phi$, is first computed as:

$$\Delta\phi = \phi_{ZAG} - \phi_{ZIG} - \phi_0$$

where $\phi_{ZAG}$ and $\phi_{ZIG}$ are the phases of the individual ZAG and ZIG bursts, respectively, determined as described above, and $\phi_0$ is a constant phase-offset which is a function of the starting phase-offset of the servowritten pattern. For the pattern shown in FIG. 3, $\phi_0 = 45$ degrees (or π/4 radians). This results in a value of $\Delta\phi$ of 0 at the center of an even servo-track 310, and 180 degrees (or π radians) at the center of an odd servo-track 312. It is possible to choose a set of initial phase-burst offsets that would result in $\phi_0 = 0$. For example, if the ZIG-burst was advanced by 22.5 degrees (or π/8 radians) instead of being in-phase with the digital information, and the ZAG-burst was delayed by the same amount of phase, but the change in burst-phase between succeeding servowriting steps was maintained as it is in FIG. 3, then the proper value of $\phi_0$ would be 0.

For the discussion below, phase-angles will be referred to in terms of radians, for the sake of simplicity. It will be assumed that either burst-phase might lie anywhere within the interval, $\{-\pi:\pi\}$. Thus, with $\phi_0 = \pi/4$, $\Delta\phi$ might lie anywhere within the range, $\{-(9/4)\pi:(7/4)\pi\}$. If the demodulated (and de-Gray-coded) servo track-number is even, then the value of $\Delta\phi$ is "wrapped" to lie within the range $\{-\pi:\pi\}$, but if it is odd, then $\Delta\phi$ is "wrapped" to lie within the range, $\{0:2\pi\}$. Specifically:

$$\Delta\phi_{wrapped} = \begin{Bmatrix} \mod(\Delta\phi, 2\pi) - \pi; & tkNum \ \& \ 1 = 0 \\ \mod(\Delta\phi, 2\pi); & tkNum \ \& \ 1 = 1 \end{Bmatrix}$$

where tkNum is the value determined by demodulating and de-Gray-coding the servo track-number read in from the wedge, the "&" represents a logical-AND operation (to determine the parity of the track-number, tkNum), and mod( ) is the modulo function, well-known to those skilled in the art.

With the above processing, the demodulated radial position is determined to be:

$$POS = (tkNum \, \& \, 0xFFFFFFFE) + \frac{\Delta\phi_{wrapped}}{\pi}$$

where the "&" is a logical-AND operator, so that the quantity, (tkNum & 0xFFFFFFFE) is the track-number with the bottom bit cleared.

While the position demodulation has been described above for a specific burst-phase advance/delay per servo-writing-step, and a specific initial burst-phase advance/delay, similar algorithms can be used to determine the position as a function of the demodulated (and de-Gray-coded) track-number, and the phases of the individual bursts. For larger amounts of phase advance/delay per servowriting-step, it may be necessary to take into account the phases of individual bursts (and not just the phase-difference between bursts) to correctly combine the burst-phases and track-number, but such manipulations will be apparent to one of skill in the art.

Figure 4:
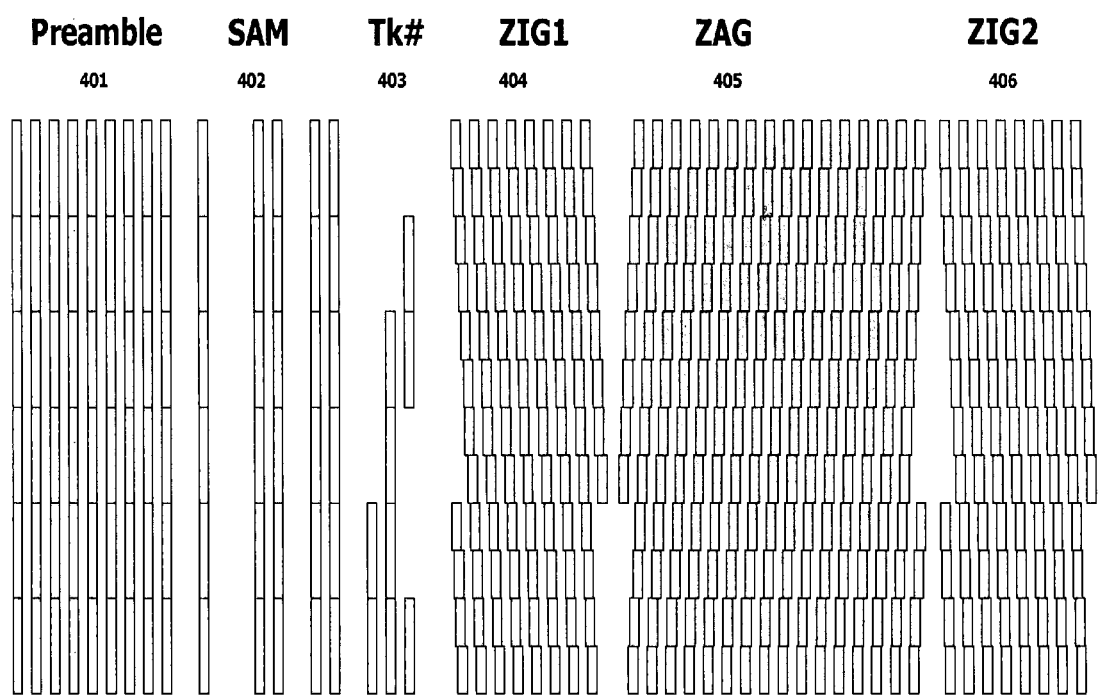
FIG. 4 is a diagram showing another example of servo information that can be written to the tracks shown in FIG. 2.

The use of phase-burst patterns for HDD servo is known in the art. One example of such a pattern can be found in U.S. Pat. No. 4,549,232, incorporated herein by reference. FIG. 4 shows a burst-pattern similar to one disclosed in that document. The main difference between the pattern of FIG. 4 and that of FIG. 3 is that the two same-length bursts of FIG. 3 have been replaced by 3 bursts of non-equal length. The first and third bursts, 404 and 406 (which are the same length) have phases that are further delayed as one moves down the page, while the second burst 405 (roughly twice as long as either the first or third bursts) has a phase that advances as one moves down the page. One could also interpret this pattern as having 4 roughly equal-length bursts, the first and fourth burst being labeled as ZIG1 404 and ZIG2 406, while the middle two bursts are both contained within the region labeled ZAG 405. This type of burst arrangement has the advantage that small errors in the frequency of demodulation sampling will not contribute significantly to errors in the phase-measurement, because the centroid of the combined ZIG1/ZIG2 burst is at the same location as the centroid of the ZAG burst. The burst-arrangement of FIG. 3 will produce an erroneous error in the phase-difference, $\Delta\phi$, between the ZIG 304 and ZAG 305 bursts if the sampling frequency is in error. The disadvantage of the pattern of FIG. 4 is that the bursts occupy a larger disk-area (or, if they are shrunk to fit within the space allotted to bursts in FIG. 3, more space will be devoted to regions between bursts, so fewer burst-cycles can be demodulated). A servo designer must trade off the relative advantages and disadvantages of the two burst arrangements of FIGS. 3 and 4. Both arrangements (and others) can benefit from the present invention.

The servo patterns used by a HDD can be written to the disk surfaces in any of a number of different ways. It is possible to use a servowriter to control the radial and circumferential placement of the servo wedges in a partially-assembled or a fully-assembled drive before it is sealed. One example of the use of a servowriter is disclosed in U.S. Pat. No. 5,748,398 by Seo, entitled "Method For Writing Servo Signals Onto A Magnetic Disk And Magnetic Disk Drive Equipped With Magnetic Disk(s) Having Servo Pattern Recorded By The Method", incorporated herein by reference. It is also possible for the HDD to write servo patterns to all of its surfaces, using so-called "Self-Servowriting" techniques (often referred to by the acronym, SSW, for "Self-Servo-Writing"). One example of self-servowriting using a magnetically-printed reference pattern is disclosed in U.S. Pat. No. 6,738,205 by Moran, et al., entitled "Self-Writing Of Servo Patterns In Disk Drives", incorporated herein by reference. The self-servowriting of HDDs has become more popular recently, because of the difficulty of accurate servowriting by external servowriters, and the cost of those servowriters. As drives attain higher track-densities, the number of tracks on a drive of a given size grows. This generally lengthens the amount of time necessary for a servowriter to write the drive, which can increase the cost of servowriting to unacceptable levels. It is also possible to write servo patterns to disks before they are assembled into drives (using a so-called "media-writer"), but this process can still be very costly. Such pre-written disks will also suffer from written-in runout due to the fact that they were written on one spindle, and then placed onto another (i.e., the spindle of the drive). Slight mis-centering can result in eccentricity in the pattern. Also, slight differences between the clamping in the media-writer and in the HDD can cause higher harmonics of written-in runout (due to slight warping of the disk). Even though self-servowriting can also take a long time to complete, the process generally costs much less, because a drive can self-servowrite with no external mechanical or electrical equipment (other than a secure mounting and a power-supply). For these reasons, most drive manufacturers are either moving towards self-servowriting solutions or have already adopted them.

Figure 5:
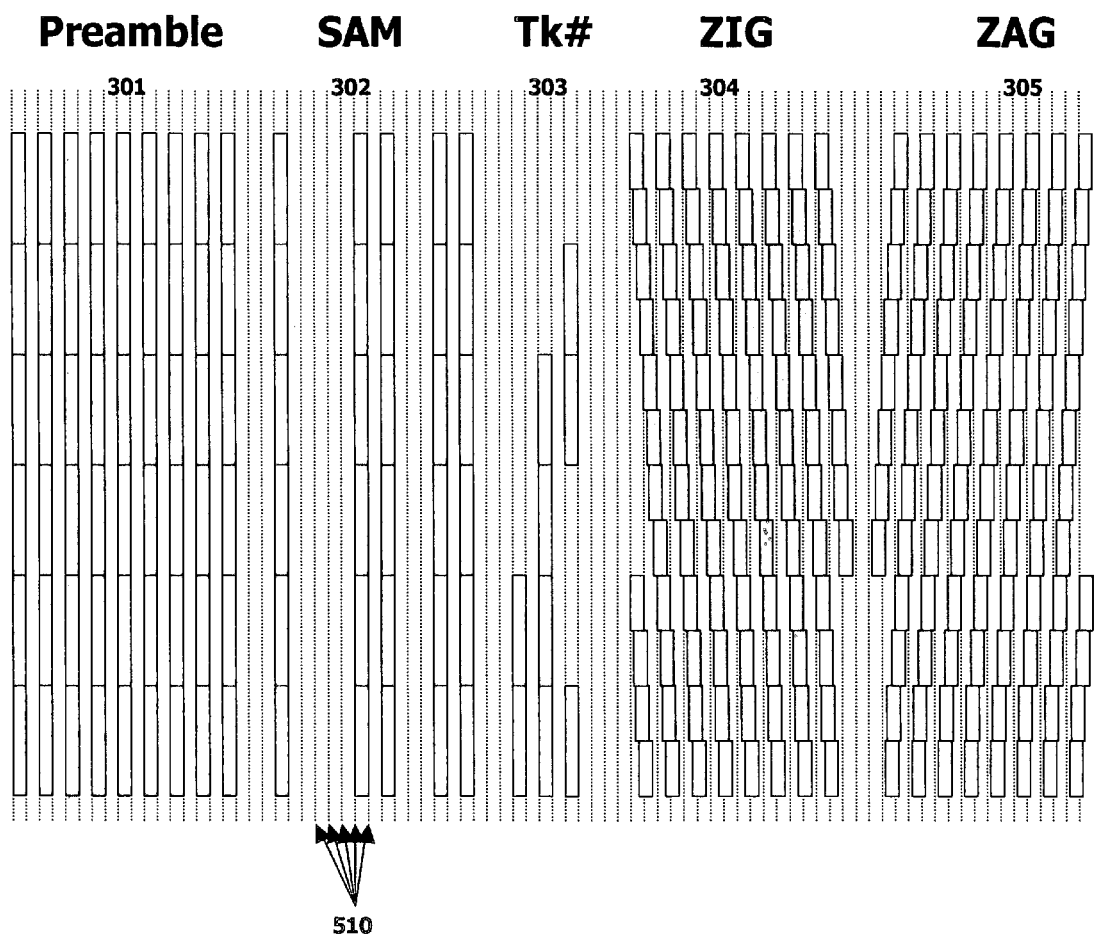
FIG. 5 is a diagram showing the servo information shown in FIG. 3, along with digital timing information.

FIG. 5 shows the servo wedge pattern first shown in FIG. 3, but including lines 510 at regular intervals that are synchronous with the digital information in the wedge. In this Figure, it can be seen that the top row of ZIG 304 and ZAG 305 bursts are written synchronously with the digital information. That is, both the top row of digital information and the first row of bursts could be written in a single revolution using a constant-frequency write-clock. The next row of bursts is not synchronous with the clock-lines. Thus, those bursts could not be written in the same revolution as the corresponding digital information using a constant-frequency write-clock, with no phase-jumps.

In order for a drive to write a servo-pattern to itself (i.e., to execute a self-servowriting algorithm), it must generate a write-clock that is somehow synchronized to the revolution of the disk. This is necessary to write coherent servo patterns. A coherent servo pattern is defined as one for which the timing of transitions on one track is either in-line with those of an adjacent track or mis-synchronized by a controlled amount. For example, in FIG. 5, all of the transitions in the Preamble 301 are aligned with one-another, moving from track to track. The same is true of the SAM 302 and Track-number 303. All of those transitions are in line with clock-lines 510. Not all of the transitions in the ZIG and ZAG bursts are in-line with those clock-lines, but their phase-offsets relative to the clock-lines are intentional and controlled. It is impossible, in practice, to align transitions from track to track perfectly, but the in-coherence (defined as the level of timing mis-placement of transitions) can typically be kept to a small fraction of the time of one cycle of the servo signal (from, say, one white-to-shaded edge in the Preamble 301 of FIG. 5 to the next, moving from left to right in that figure).

Figure 15:
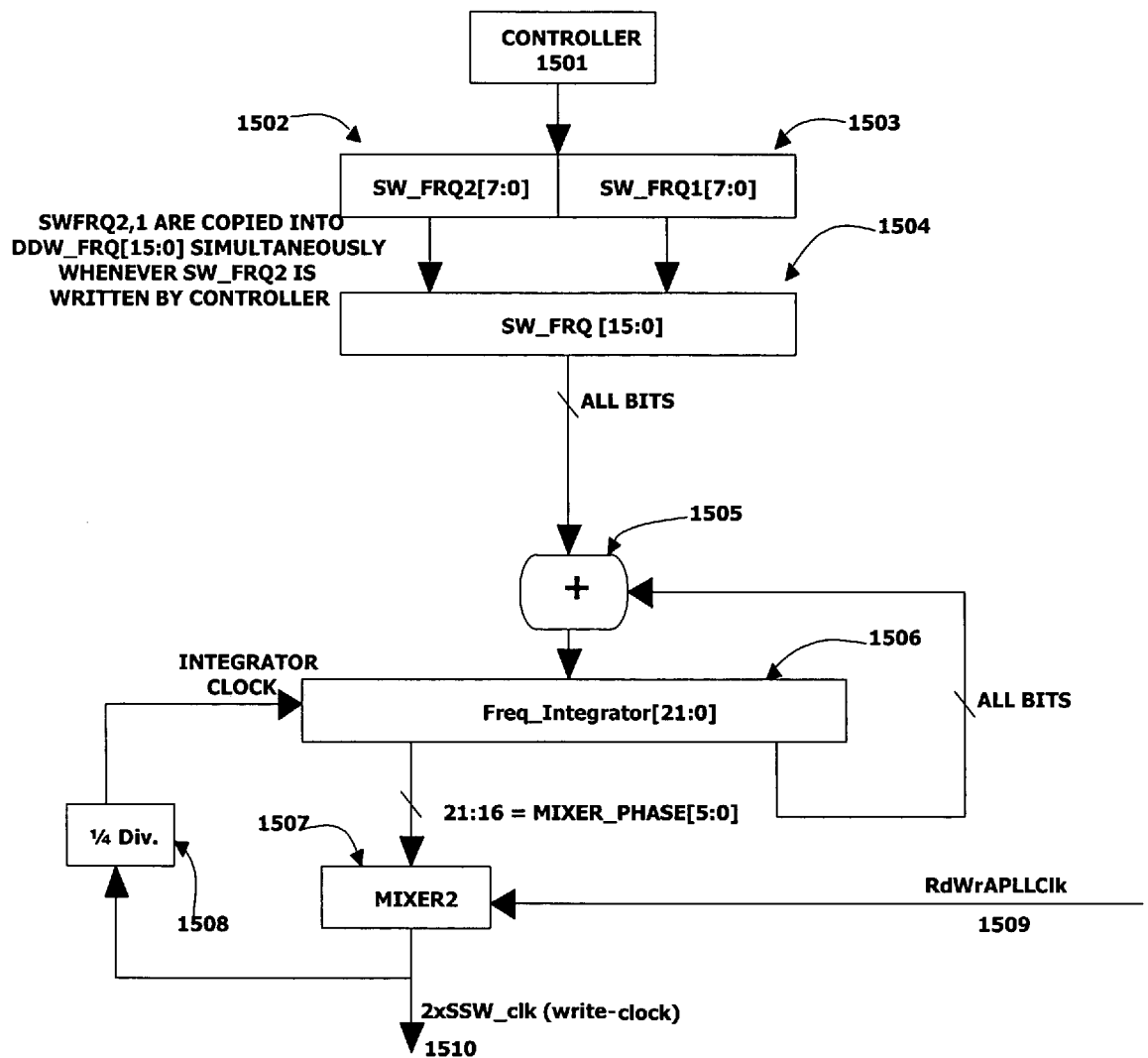
FIG. 15 shows a portion of self-servowriting clocking circuitry of the prior art.

One scheme for generating a synchronous write-clock is disclosed in Moran et al. (referred to above). FIG. 15 depicts the mechanism disclosed in that application for generating a write-clock, labeled 2×SSW_Clk 1510. Under the direction of firmware running in the drive, the register labeled SW_FRQ 1504, is updated once or more per servo sample of a reference servo pattern, in order to control the phase of the write clock 1510 relative to that of a stable base clock, labeled "RdWR APLL Clk" 1509, in that figure. In general, during the time of writing of a servo wedge, the SW_FRQ register retains a constant value (whatever was most recently written to it via drive firmware). Thus, the phase of all servo-patterns written for a single wedge will have a constant phase/frequency-relationship with that of the base clock. At any time, the phase of the write-clock 1510, relative to that of the base clock 1509 is the value of the register labeled Freq_Integrator 1506 (which might be more aptly named "Phase-Integrator"). That register is updated once every 4 cycles of the write-clock 1510 with the desired frequency-offset from the SW_FRQ register 1504. It is possible, using this hardware, to arrange the drive firmware to produce a constant phase-offset in the write-clock, relative to the in-phase lines shown in FIG. 5, but it is not practical to write both the digital information and phase-offset bursts (for example, those in the second or third rows of FIG. 5) in a single revolution of the disk.

Figure 6:
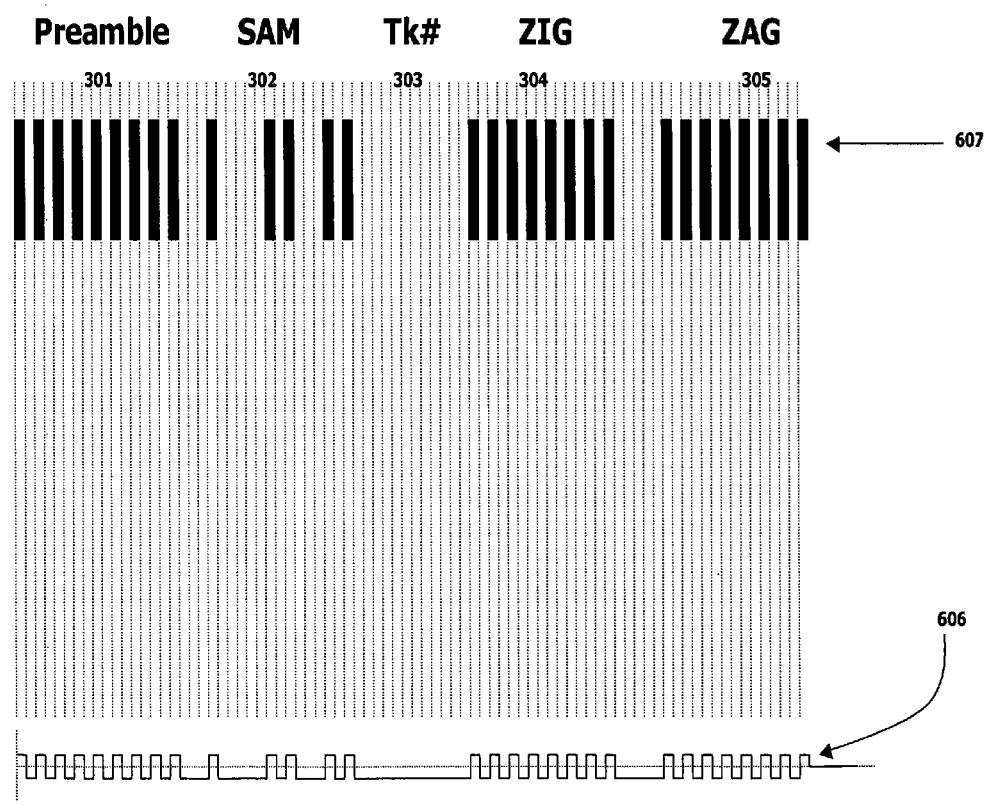
FIGS. 6–8 are diagrams showing a progression of servowriting steps involved in writing the servo information shown in FIG. 3, along with write-current waveforms used to write the servo information.

FIG. 6 shows a servo-pattern that might be present immediately after a first servowriting-step of a self-servowriting operation. For this first servowriting-step, all of the transitions (both the digital information and both of the bursts) are in-phase with the digital write-clock. Thus, they could all be written in a single revolution of the disk using the hardware shown in FIG. 15. FIG. 6 shows a write-current waveform 606 that could be used to write the shaded bursts in that figure.

Figure 7:
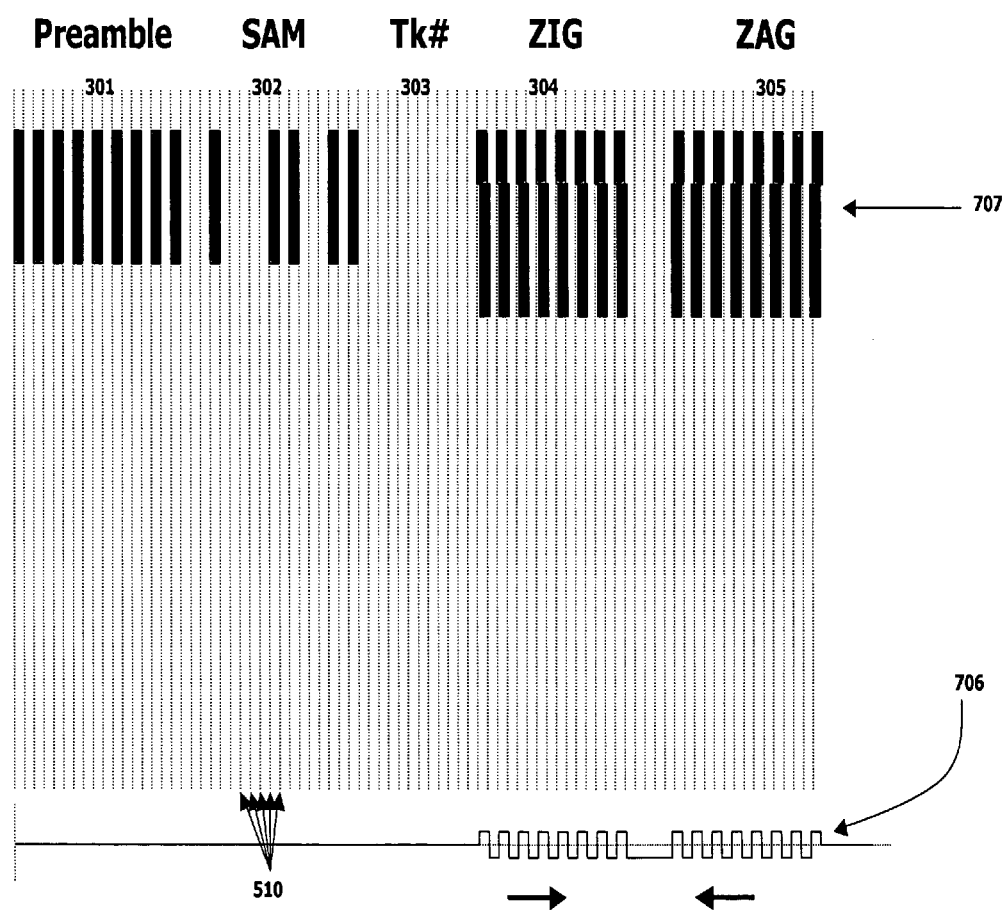

FIG. 7 shows the results of a second servowriting-step, in which the R/W head has been moved ½ of a servo-track in the direction of servowriting (down in the figure), and only bursts have been written. That figure also shows a desired write-current waveform 706. It can be seen that the ZIG-burst 304 has been delayed slightly in phase, relative to the digital data clock-lines 510, and that the ZAG-burst 305 has been advanced slightly in phase, relative to those same lines.

Figure 8:
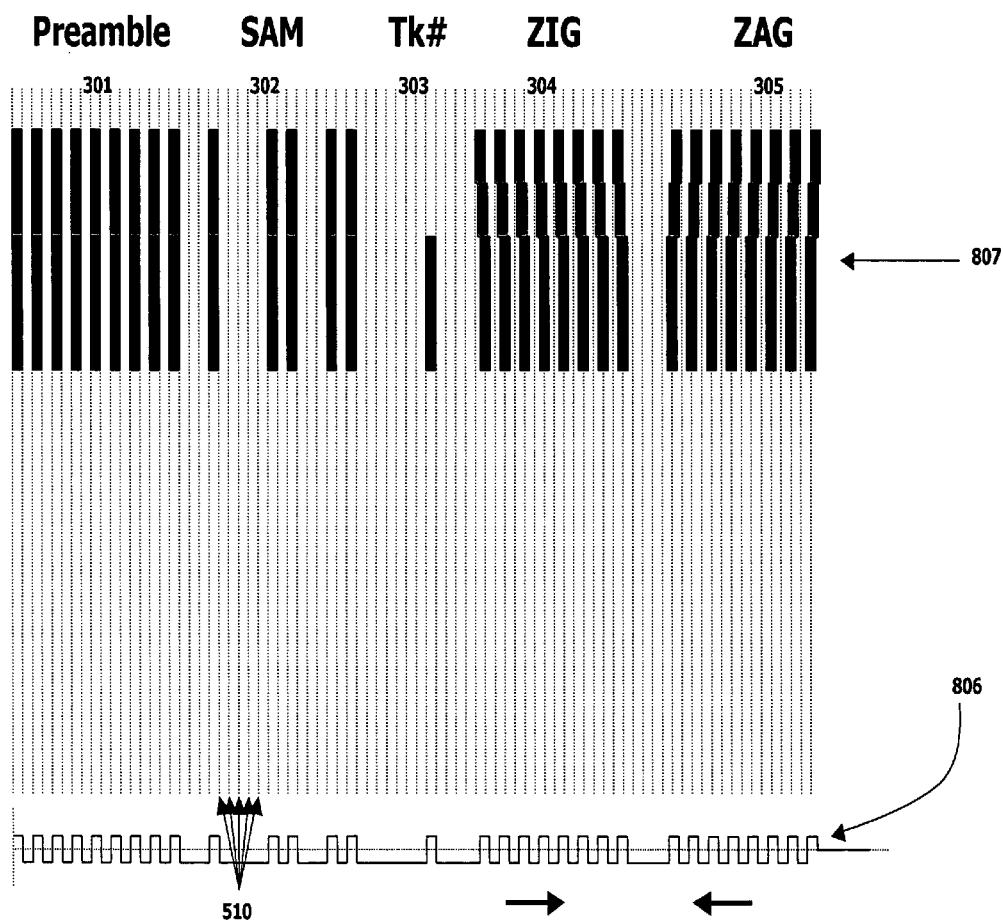

FIG. 8 shows the results of the next servowriting-step, in which the R/W head has been moved another ½ servo-track (down in the figure), and both digital and burst information has been written. The write-current waveform 806 has been shown as well. Once again, the digital information is in-phase with the digital clock-lines 510, but the bursts are not.

Figure 9:
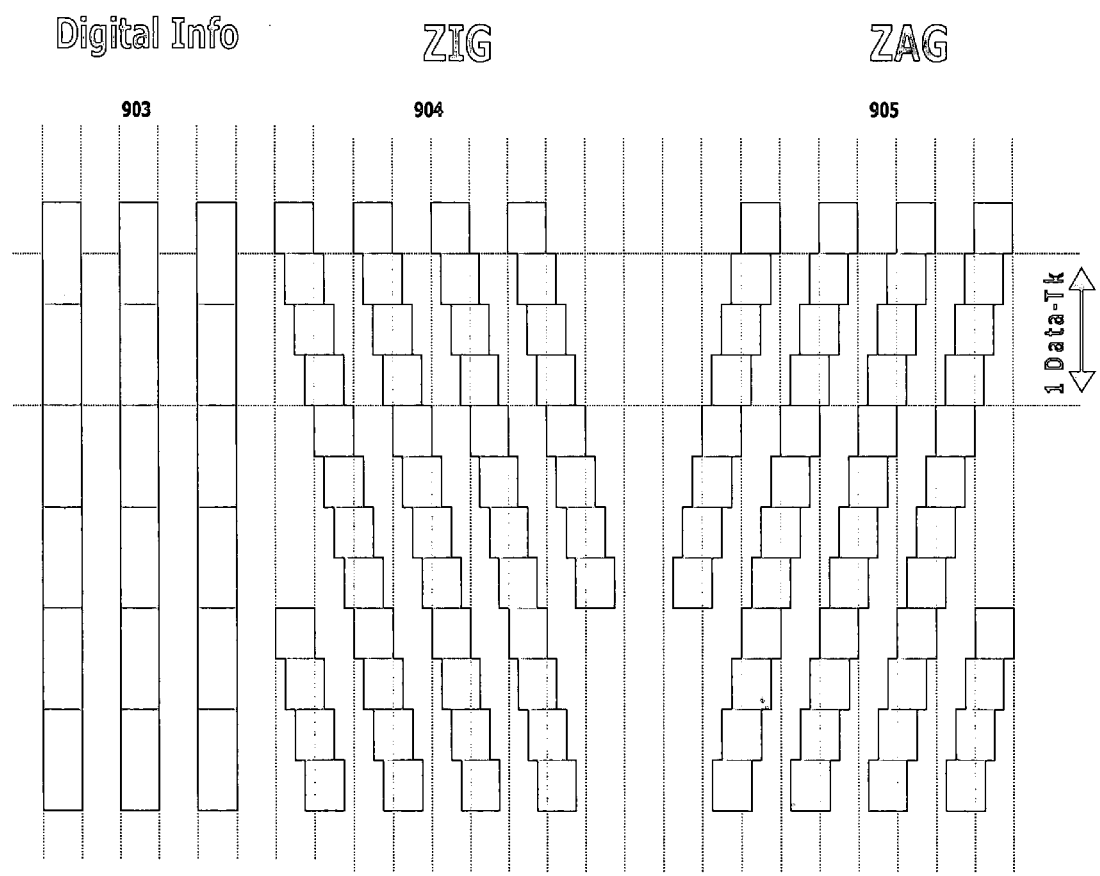
FIG. 9 is a diagram showing servo-information in more detail.
Figure 10:
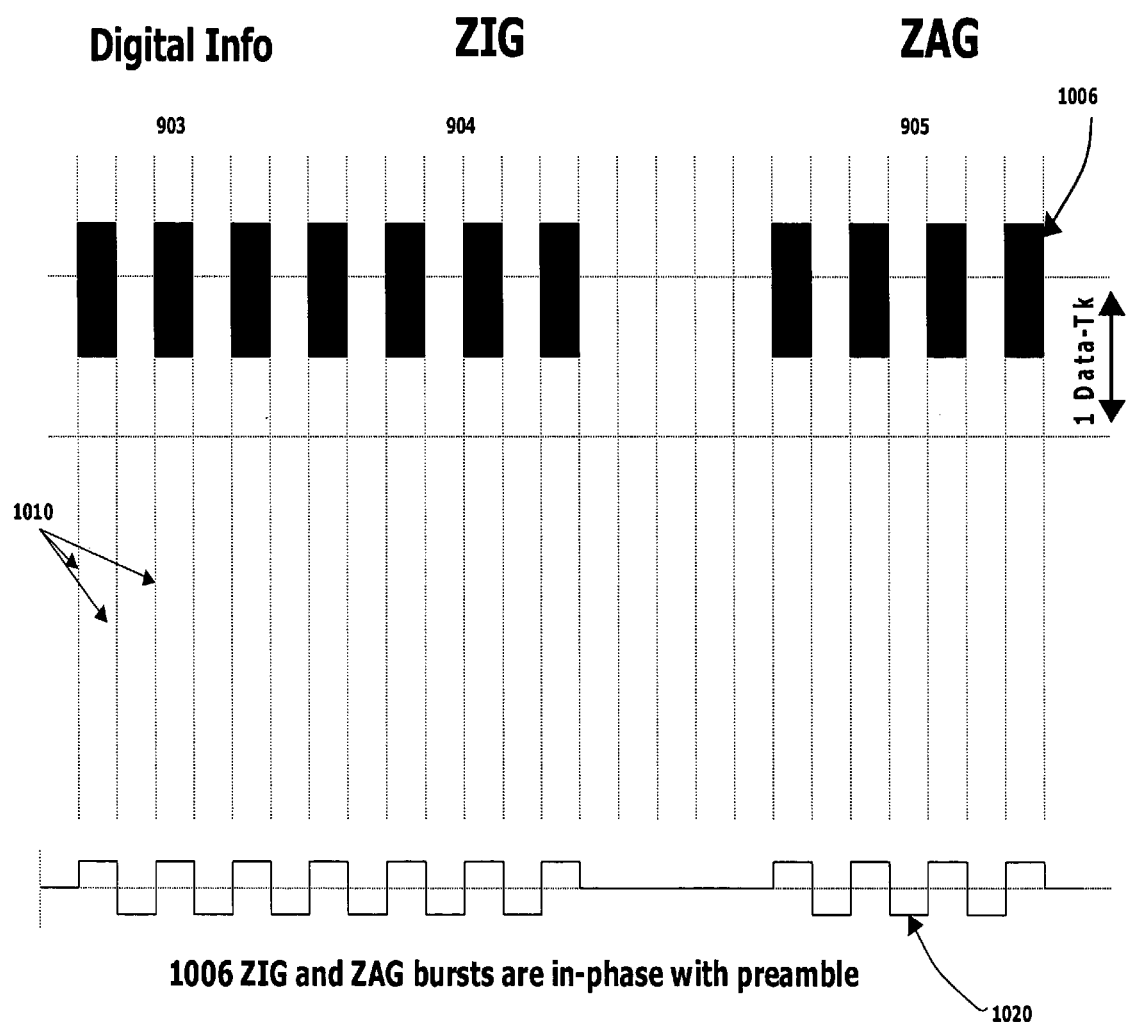
FIG. 10 and are diagrams showing a progression of servowriting steps involved in writing the servo information shown in FIG. 9, along with write-current waveforms used to write the servo information.
Figure 11:
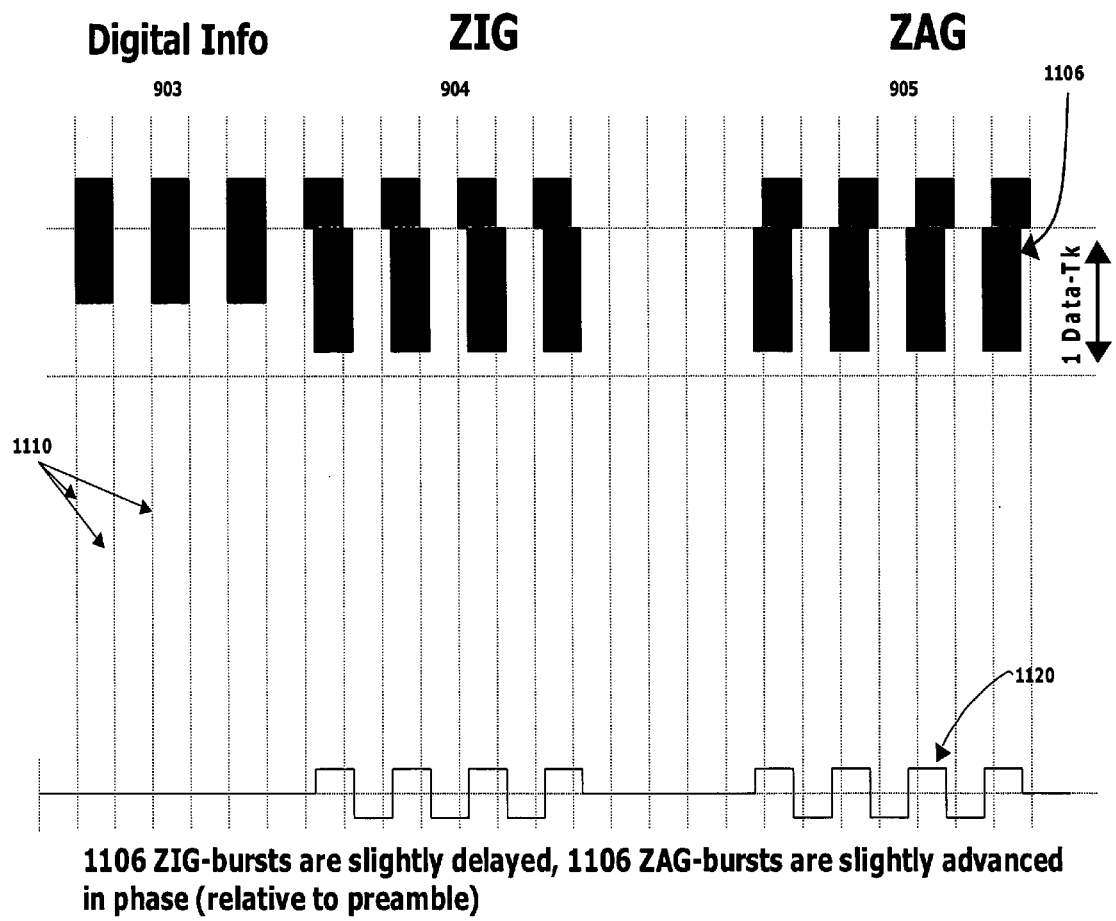
FIG. 11 is a diagram showing the same servo information shown in FIG. 9, highlighting servo-information written during another servowriting-step.

FIG. 9 shows a simplified view of a servo wedge, showing only a small amount of digital information 903 and the ZIG 904 and ZAG 905 bursts (in order to better show the phase-offsets of the bursts, relative to the each other, and to the digital information). FIG. 10 shows the servo-pattern after a single servowriting-step (as shown previously in FIG. 6), along with the corresponding write-current waveform 1020. FIG. 11 shows the servo pattern after the second servowriting-step, and the corresponding desired write-current waveform 1120. In that figure, it can clearly be seen that the write-current transitions of the ZIG burst 904 are delayed relative to the digital write-clock lines 1110, and the write-current transitions of the ZAG burst 905 are advanced relative to those same lines.

Figure 12:
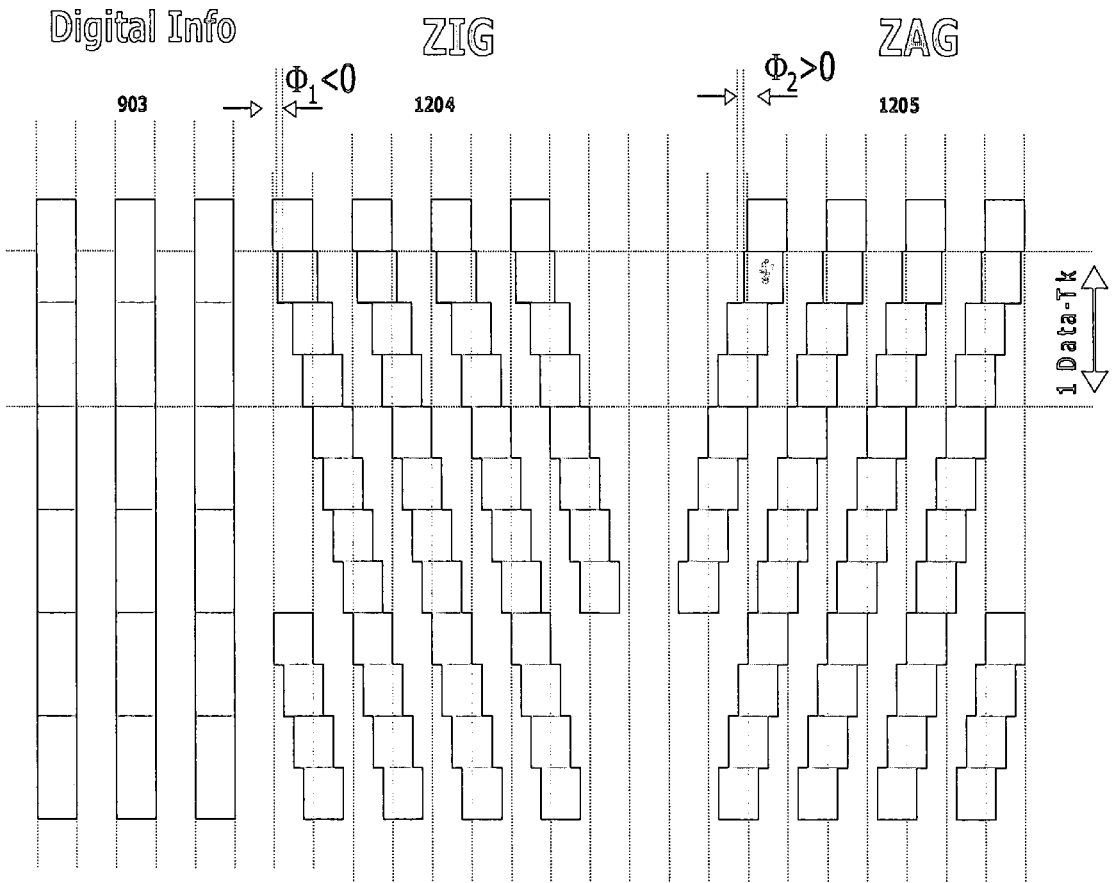
FIG. 12 shows a servo-pattern written using prior art, which suffers from coherence-errors.

As stated above, while it is possible to provide a write-clock that is relatively coherent from one servowriting-step to the next, it is impossible to write with perfect coherence. With a prior-art self-servowriting write-clocking systems (such as the one shown in FIG. 15), it is necessary to write most of the ZIG and ZAG bursts in separate passes, because of the inability of the prior-art systems to change the phase of the write-clock for different bursts. Thus, the ZIG and ZAG bursts would need to be written during separate revolutions of the disk. FIG. 12 shows a servo pattern with the ZIG 1204 and ZAG 1205 bursts written during different revolutions of the disk. From that figure, it can be seen that during the writing of the second row of ZIG-burst transitions, the write-clock was slightly ahead of its intended phase (so that it wrote a ZIG-burst with phase slightly advanced, relative to its intended phase). It can be seen that during the writing of the second row of the ZAG-burst transitions, the write-clock was slightly behind its intended phase, so that the transitions in that row are almost aligned in phase with those of the row immediately above. Because the position is computed in part by a determination of the phase-difference between the two bursts, the combined effect of these errors in the coherence of the bursts is to cause a significant error in the position detection. Since the two phase-errors (encountered during writing of the two bursts) may be un-correlated, they are about as likely to be of the same or different sign, and are likely to be of different magnitudes. Since the fractional track position is a function of the difference between the phases of the two bursts, the coherence errors during writing of the pattern can cause significant imperfections in the servowriting.

Figure 13:
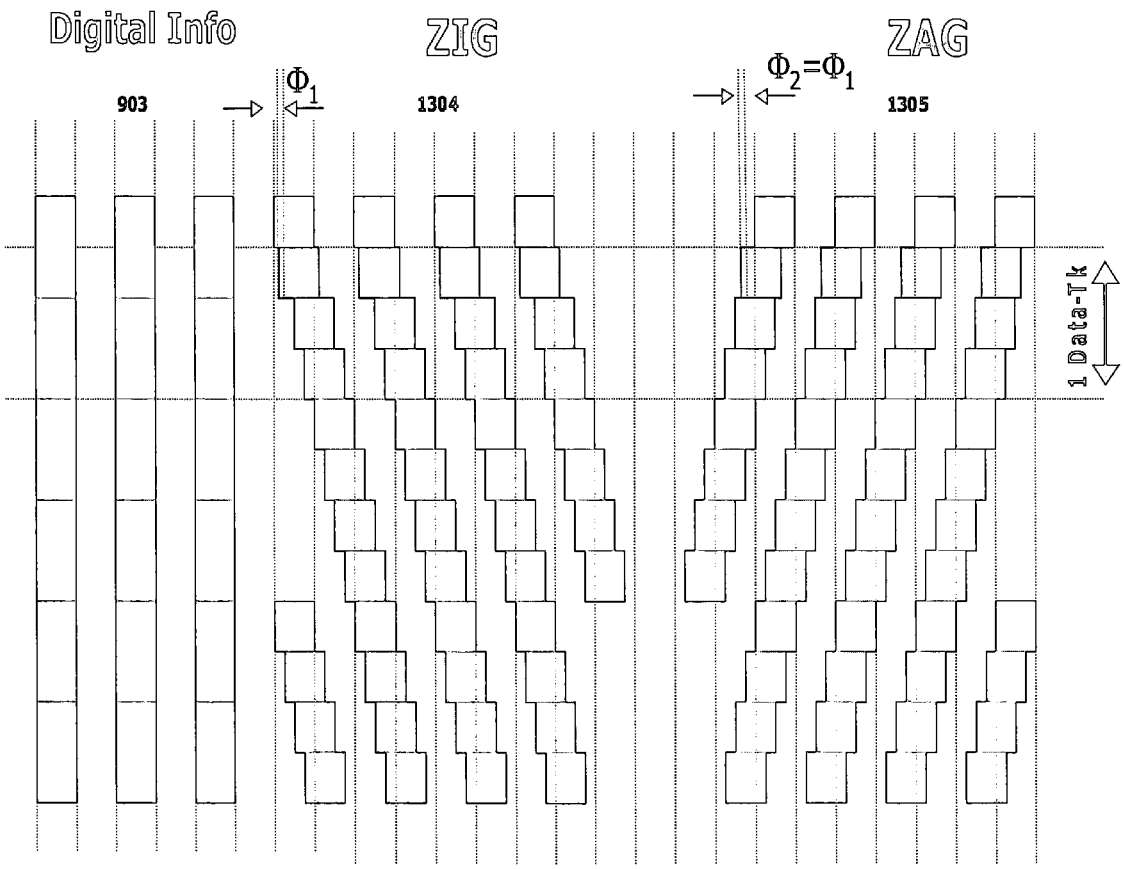
FIG. 13 shows a servo-pattern that is written using one embodiment of the invention, which is relatively immune to coherence-errors.

If it were possible to write both the ZIG and ZAG bursts in a single pass, then they would share whatever coherence-error was present during their writing. FIG. 13 shows the situation in which the ZIG 1304 and ZAG 1305 bursts were written with a common coherence-error. In that figure, it can be seen that both bursts are advanced in phase, relative to the intended phase of the write-clock. If these bursts were demodulated, the resulting phases would be advanced relative to their intended values. Because the position is determined as a function of the difference between the two phases, however, to first order, there would be no resulting error in the position determination. This holds true even if the R/W head straddles bursts written during multiple servowriting-steps. The important thing is that the bursts who's phase-differences determine the demodulated position have the proper phase-offset, relative to one-another.

Figure 16:
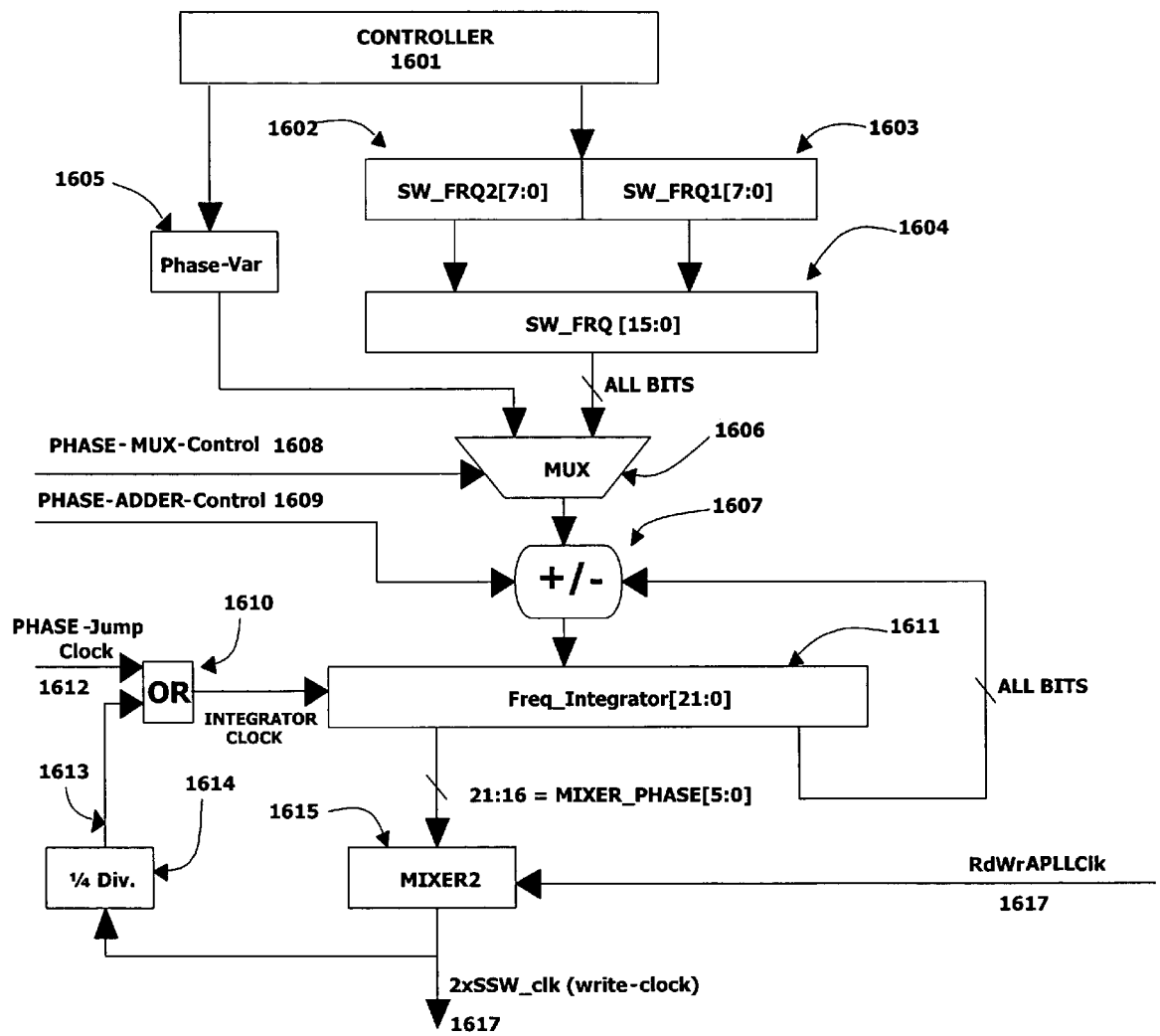
FIG. 16 shows improved self-servowriting clocking circuitry, which allows use of the invention.

An embodiment of the present invention concerns systems and methods for modifying the write-clock used to write servo patterns to a disk in order to minimize effects of minor coherence-errors suffered during self-servowriting operations. FIG. 16 shows a modified system for generating a write-clock 1617 that can address the shortcomings of the prior art systems. In addition to the elements of the prior art (depicted in FIG. 15), this system has the capability to cause immediate phase-shifts in the write-clock during the writing of servo bursts. A register, labeled Phase-Var 1605, specifies a phase-amount to be either added to or subtracted from the value of the Freq_Integrator register at various times between the writing of servo bursts. A MUX (multiplexer) 1606 selects between either the SW_FRQ 1604 or Phase-Var 1605 registers to be added to Freq_Integrator. The Phase-Var phase-offset is added to Freq_Integrator at times between its normal updates of SW_FRQ. The PHASE-Jump Clock 1612 is OR'ed with the divided-down write-clock 1613 (divided-down by the "¼ Div" block 1614), and is constrained by controller hardware (not shown) which insures that edges of the Phase-Jump Clock come between edges of the divided-down write-clock. One way (of many possible ways) to generate a Phase-Jump clock that does not interfere with the divided-down write-clock is to use the "¼ Div." divider 1614 to generate all 4 phases of a divided-down write-clock, use one phase as the divided-down clock 1613 and gate another with other logic to generate the PHASE-Jump clock 1612. It is possible to use more sophisticated circuitry than a simple OR-gate 1610 to combine the two possible clock-sources for the Freq_Integrator register 1611, but the OR-gate will suffice if other circuitry is used to ensure against a collision of the two clock-signals. If the OR-gate solution pictured in FIG. 16 is used, it may be necessary to add circuitry to the "¼ Div." divider circuit to convert the rising edge of the clock-signal 1613 into a short clocking pulse (to prevent a long high-level in the signal, which could interfere with the Phase-Jump Clock signal 1612).

When it is desired to add phase to the write-clock 1617, the PHASE-MUX-Control signal 1608 is used to cause the MUX 1606 to select the Phase-Var register 1605 instead of the SW_FRQ register 1604 as a source to the Adder 1607. The PHASE-ADDER-Control signal 1609 determines whether phase is added to or subtracted from the Freq_Integrator register 1611.

Figure 17:
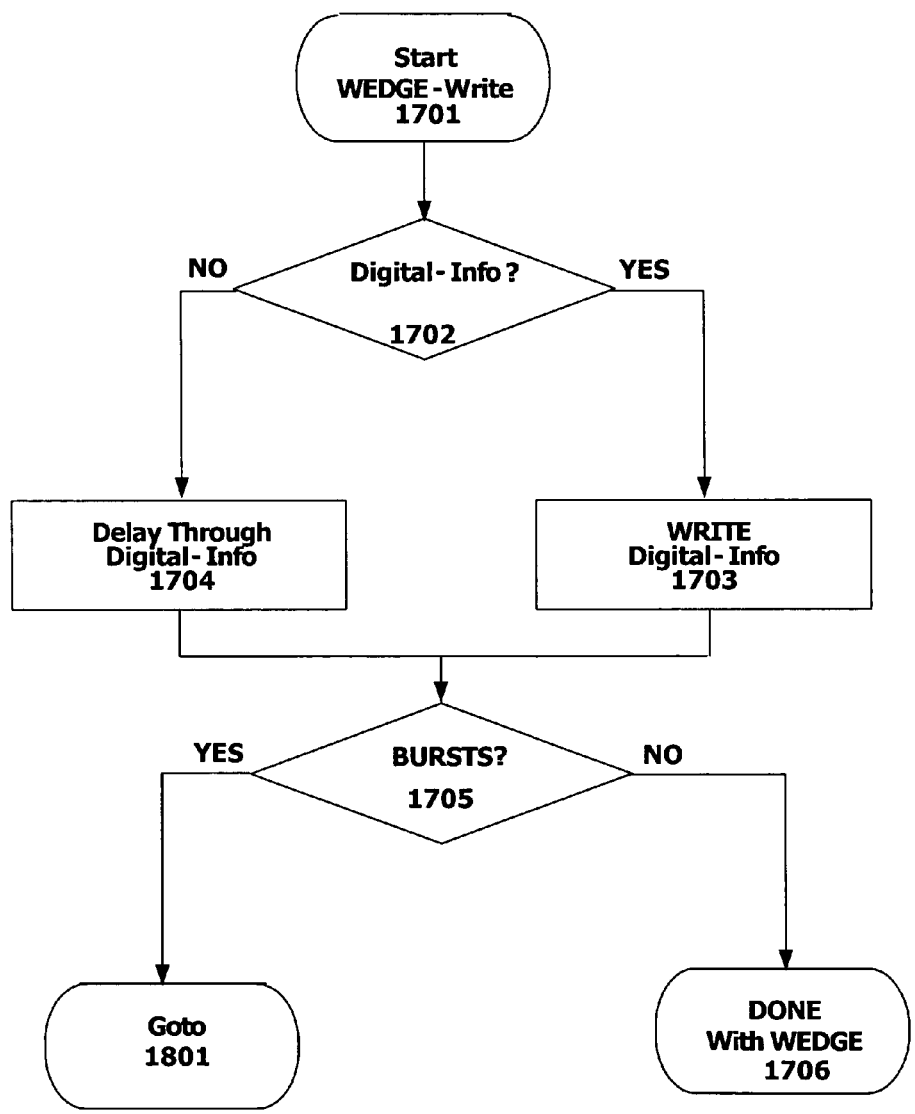
FIG. 17 shows the first portion of a flow-chart which can be used to implement one embodiment of the invention.
Figure 18:
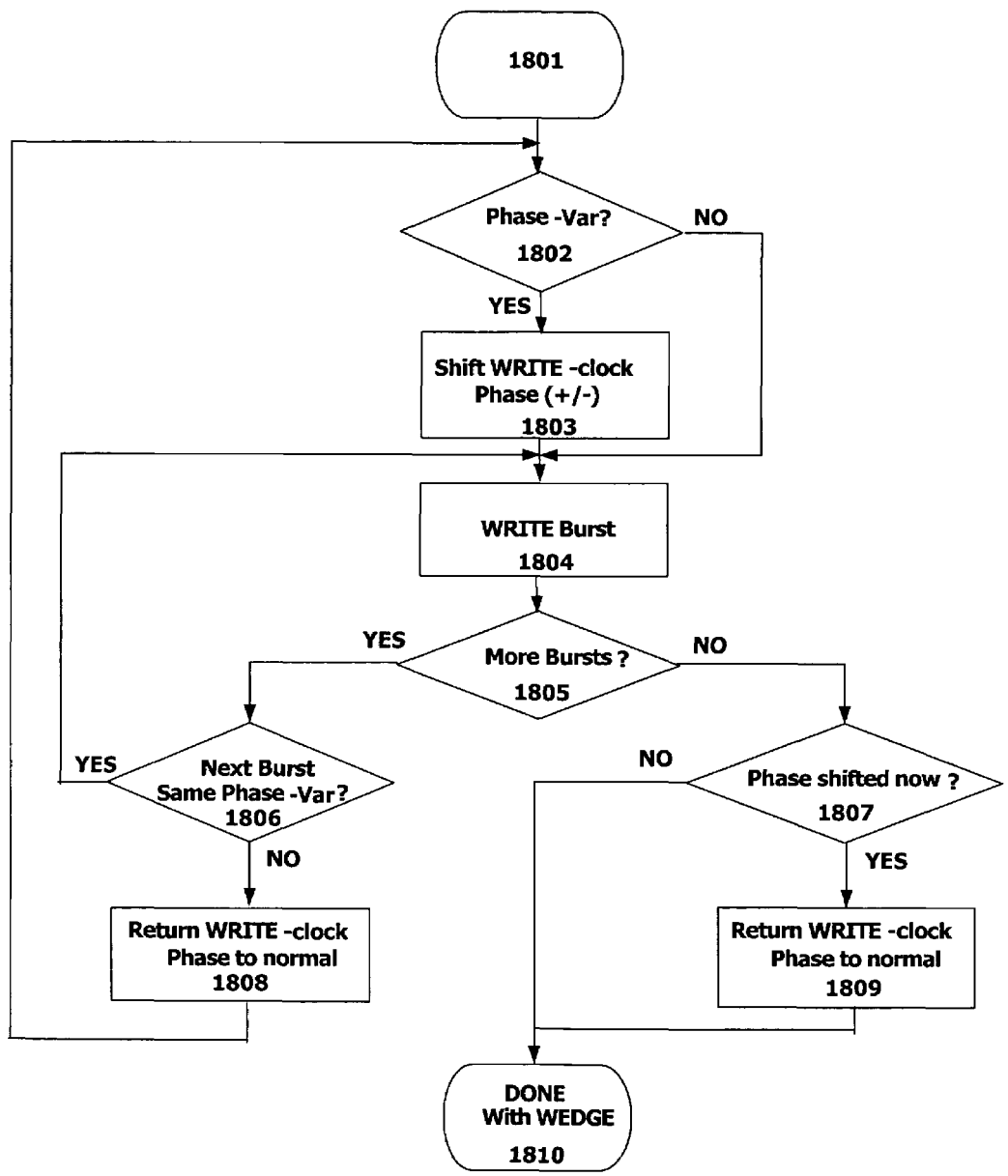
FIG. 18 shows the second portion of the flow-chart which can be used to implement one embodiment of the invention.

FIGS. 17 and 18 show a flow-chart to be implemented by hardware for use during writing of servo-wedges by a self-servowriting scheme. FIG. 17 shows the initial steps. The process starts with beginning to write a servo-WEDGE in step 1701. The hardware checks whether digital information needs to be written for the ongoing servowriting pass in step 1702. If no digital information is to be written in the current pass, then the process delays through the time during which digital information would be written to the disk surfaces in step 1704. If digital information is to be written to the disk surfaces in step 1703, then that information is written, with an un-altered write-clock 1617. Then, the system checks whether any bursts are to be written during the current servowriting pass in step 1705. If no bursts are to be written, then servowriting is done for the current wedge in step 1706. Otherwise, control passes on to burst-writing in step 1801. FIG. 18 shows the burst-writing process, beginning with 1801. For each burst, the system checks whether writing of the burst requires a phase-change in the write-clock 1617 in step 1802. If a phase-change is required, then it is implemented in step 1803, as described above, using the value in the Phase-Var register 1605 to specify the phase-change magnitude, and the PHASE-MUX-Control 1608, PHASE-ADDER-Control 1609, and PHASE-Jump Clock 1612 signals, properly timed, to control the sign and timing of the phase-jump. The burst is written in step 1804, with whatever clock phase-shifts were requested. Next, in step 1805, the system checks whether any more bursts are to be written. If not, then any phase-shifts (due to the just-written burst) detected in step 1807 are reversed in step 1809, and wedge-writing for the current wedge is finished in step 1810. If any more bursts are to be written, the system checks whether the next bursts requires the same phase-shift as the previous one in step 1806. If the next burst is to have the same phase-shift as the just-written one, then the system proceeds directly to writing it (at the proper time) in step 1804. If the required phase-shift of the next burst is different from that of the just-written one, then any phase-offset of the current burst is reversed in step 1808. The system than loops back to step 1802 to check for any necessary phase-shift of the next burst. In this way, it is never necessary to command any phase-shifts other than plus or minus the value contained in the Phase-Var register 1605.

In a typical self-servowriting system, the write-clock runs at a frequency of at least 4 times the sinewave frequency of the written signal. Referring to FIG. 10, a 4-X write-clock will have two rising edges for every write-clock line 1010 in that figure. Since all of the digital data transitions are synchronous with the write-clock lines shown in FIG. 10, this write-clock speed is actually higher than absolutely necessary for most servo patterns, but it is convenient in that coincides with the clock-frequency used during demodulation of the servo signal (i.e., four A/D samples per sinewave cycle of the servo pattern). In order to delay/advance the burst-phase arbitrarily, relative to that of the digital data, the system must be able to delay/advance the writing of bursts by up to +/−2 clock-cycles of the write-clock. The system of FIG. 17 is capable of delaying/advancing the phase of the clock by only +/− one-half clock-cycle. In fact, since the system disclosed in Moran et al. uses a write-clock that runs at 8 times the sinewave-frequency of the servo pattern, it would be necessary to advance/delay burst-writing by up to +/−4 clock-cycles. Any delay beyond +/− one-half clock-cycle can be achieved by a combination of a fractional-cycle advance/delay (accomplished as described above) and advance/delay of the start of burst-writing by an integer number of write-clock cycles, as would be apparent to one of skill in the art. The deficiency of prior-art systems is the lack of ability to write bursts of different phases, relative to the digital data or relative to one-another, in a single servowriting pass.

The embodiment described above is one of many possible ways to achieve the goal of the invention; to write phase-advanced/delayed bursts in a single servowriting-pass. It is not necessary to use a divided-down phase-update clock 1613, as shown in FIG. 16. The updates of the Freq_Integrator register 1611 can occur every cycle of the write-clock 1617, every other cycle, or at other intervals. The phase-update from the Phase-Var register 1605 can occur at the same time as the SW_FRQ register 1604 with a more sophisticated adder 1607. If bursts with more than +/− a single phase advance/delay are required, then multiple Phase-Var registers can be used. It is possible to have a separate phase advance/delay register for each bursts to be written, at the cost of more hardware complexity. The write-clock can run at a frequency as low as 2-X the sinewave frequency of the servo-pattern, or 4-X the sinewave frequency, as well as frequencies higher than that. The figures and text presented here are specific only to best explain the invention to one of ordinary skill in the art.

It is possible that a servo pattern with even lower written-in runout (than the one discussed above) can be obtained by writing each zig and zag burst in several passes. For example, it is possible to write the first half of the zig burst and the first half of the zag burst in one pass, and then write the second half of the zig burst and the second half of the zag burst in another pass. This retains the characteristic that the coherence-errors suffered during the writing of both the first half and the second half of each burst can be canceled, respectively. If the coherence-errors are small (and the bursts do not contain a significant "write-splice" at the point where writing of the second half of each burst begins), then it is possible to demodulate the zig burst as a single burst and the zag burst as another single burst (even though each burst was written in two portions). If the coherence errors are too different between the two passes (or if starting burst-writing in the middle of a burst creates a "write-splice"), then it may be necessary to demodulate each portion of each burst separately. In that case, the two zig-zag phase-differences (i.e., the phase-difference between the first zig-burst and first zag-burst as one, and the phase-difference between the second zig-burst and the second zag-burst as another) can be averaged to obtain a more accurate zig-zag phase-difference to be used in the equations above. One advantage of writing the bursts in multiple passes is to average the mis-placements of the R/W head suffered during each separate servowriting pass. As long as the phase-difference of each zig-zag-burst-pair (or more accurately, each zig-zag-sub-burst-pair) is determined by a single servowriting pass, the coherence-errors suffered during servowriting will not contribute significantly to the written-in runout. This idea can also be extended to more than two sub-bursts, as would be apparent to one of skill in the art.

In some embodiments of the present invention, it is preferable to write the digital information in the same revolution (instead of in a separate revolution) as the zig/zag bursts during servowriting. Such approach is preferred because it would save at least one revolution time for each servowriting step that included writing of such digital information. Such single-revolution-servowriting operation can be feasible based on the following factors:

Digital information is always written without any phase shift.

Digital information is written over one servo track while zig/zag bursts are displaced ½ servo-track in the radial direction at every servowriting step. As the result, digital information only needs to be written at every other servowriting step, for example, at step 1, 3, 5, etc.

The write-clock runs at a frequency of at least 4 times the sinewave frequency of the written signal. Thus, 4 integer write-clocks would cover the whole 360 degrees (or $2\pi$ radians) that represents one (approximately) sinewave cycle of the signal, and 90 degrees and 45 degrees in phase shift would correspond to a full and a half clock cycle, respectively.

The start-time of each individual burst can be arbitrarily adjusted in units of integer write-clock cycles.

The phase of the zig/zag bursts can be adjusted by changing the phase of the entire write clock to offset by, for example, 45 degrees.

If the phases of the zig/zag bursts are not shifted by an arbitrary angle, but always at 45 degrees at each servowriting step as illustrated in the exemplary embodiment above, the servowriting at each step can take advantage of the integer write clock cycle for the servowriting of both the zig/zag bursts and the digital information as follows:

Servowriting the zig/zag bursts: since the phases of the zig/zag bursts are delayed and advanced by 45 degrees at each servowriting step respectively, the phase difference between them can be kept at an integer multiple of 90 degrees, which equals one or more integer clock cycles. Thus, if the entire write clock can be shifted back and forth by 45 degrees at each servowriting step, not only the zig burst can be written at an edge of an integer write clock, the zag burst can also be written at an edge of an integer write clock (delayed or advanced by up to a few clock cycles with respect to the zig burst).

Servowriting the digital information: when digital information is written at every other servowriting step with zero phase shift, the write clock and the zig/zag bursts have been shifted twice for a total of one integer write clock. Therefore, all three of digital information, zig and zag bursts can be synchronized to start at an edge of an integer write clock, with the zig/zag bursts delayed or advanced by integer numbers of clock cycles with respect to the digital information.

Such a servowriting approach can be used to generate a phase-burst servo pattern without utilizing any extra clock phase shifting mechanisms previously described, while still allowing the digital information, the zig and zig bursts to share the same coherence error at every servowriting step. One possible expense of such an approach is that the phase adjustment has to be fixed at 45 degrees at each servowriting step instead of allowing flexible adjustment to any phase-advance/delay per servowriting-step.

With this embodiment, none of the additional phase-adjustment circuitry shown in FIG. 16 (which was not also in FIG. 15) would be needed. All of the necessary high-speed burst-phase adjustment could be accomplished via advances and/or delays of burst-writing by integer numbers of write-clock cycles, which can be accommodated easily through the use of synchronous digital circuit design, as would be apparent to one of ordinary skill in the art. If the servowriting write-clock were to run at a speed of 8 times the sinewave frequency of the bursts (instead of 4 times the sinewave frequency), as disclosed by Moran et al., then burst-patterns with either 22.5, 45, or 67.5 degrees (as opposed to 45 degrees only in Moran) per servowriting-step could be accommodated without the need for fractional-clock phase-shifts between the writing of servo bursts.

Figure 19:
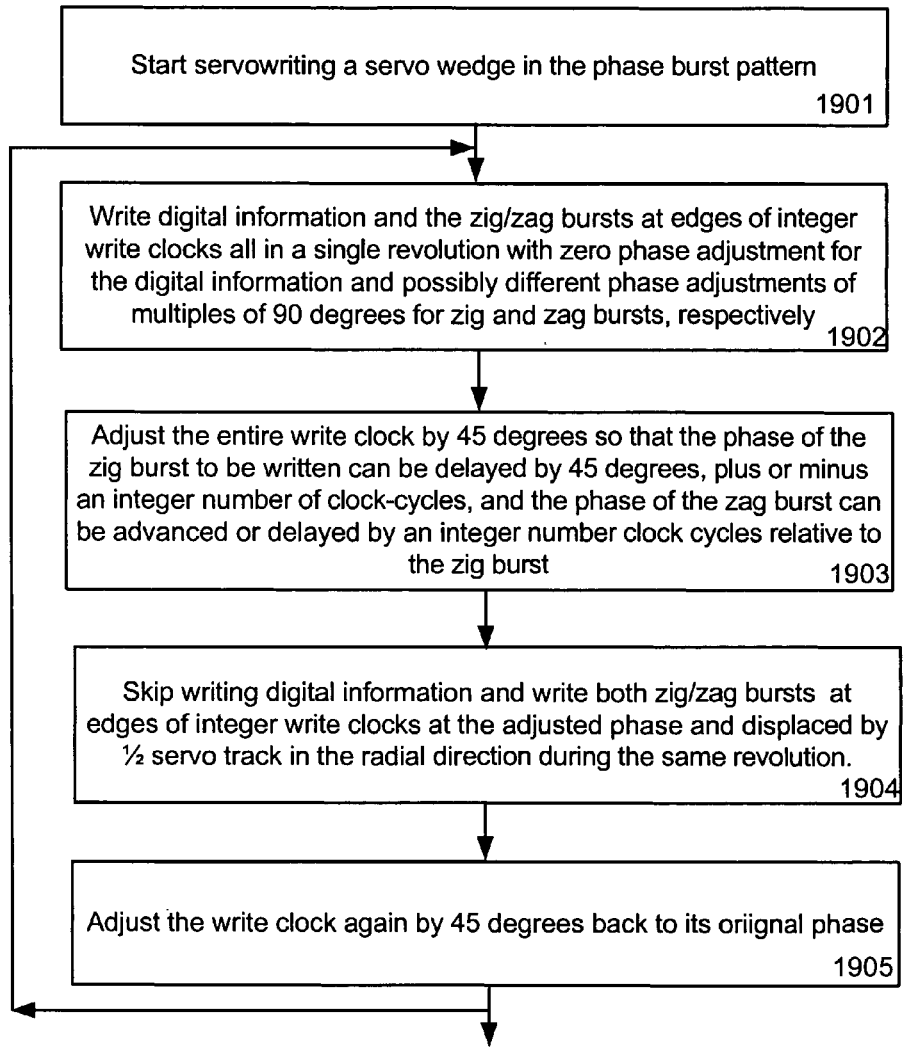
FIG. 19 shows a flow-chart which can be used to implement one embodiment of the invention without using any phase adjustment mechanism.

FIG. 19 shows a flow-chart to be implemented during writing of servo-wedges by a self-servowriting scheme without using any phase adjustment mechanism. The process starts to write a servo-WEDGE in step 1901 with a write clock running at a speed of 4 times the sinewave frequency of the bursts. Digital information as well as the zig/zag bursts are written at edges of different integer write clock cycles all in a single revolution in step 1902 with zero phase adjustment for the digital information and different phase adjustments of multiples of 90 degrees for zig and zag bursts, respectively. The digital information covers an entire servo track and the zig/zag burst each cover ½ servo track. In step 1903, the entire write clock is adjusted by 45 degrees, so that the phase of the zig burst can be delayed by 45 degrees plus or minus an integer multiple of 90 degrees (in other words, an integer number of clock cycles) and the phase of the zag burst can be advanced or delayed by an integer number clock cycles relative to the zig burst (making it advanced or delayed by 45 degrees plus or minus an integer multiple of 90 degrees, relative to the previously-written digital information). In step 1904, no digital information is written, both zig/zag bursts are written at different edges of integer write clocks with the adjusted phase and displaced by ½ servo track in the radial direction during the same revolution. In step 1905, the write clock is adjusted by 45 degrees back to its original phase. Step 1902–1905 can be repeated until the phase burst pattern is complete.

Although embodiments described herein refer generally to systems having a read/write head that can be used to write bursts on rotating medium (magnetic media), similar advantages can be obtained with other such data storage systems or devices. For example, a laser writing information to an optical media can take advantage of additional passes when writing position information. Any media, or at least any rotating media in a single and/or multi-headed disk drive, upon which information is written, placed, or stored, may be able to take advantage of embodiments of the present invention.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method for phase-burst servowriting, comprising:
    positioning the read/write head relative to the surface of the rotatable medium;
    servowriting a phase-burst pattern on the surface of the rotatable medium in one or more revolutions via the read/write head, wherein the phase-burst pattern can include both digital information and one or more zig/zag bursts; and
    at each of the one or more revolutions, performing at least one of:
        writing both a zig and a zag burst of the one or more zig/zag bursts together with the phase of the zig and/or the zag burst delayed or advanced by any degree relative to a write-clock; and
        writing the digital information with correct phase of the write clock.

2. The method according to claim 1, further comprising:
    advancing the phase of the zig burst and/or delaying the phase of the zag burst at each of the one or more revolutions in the range of one of: 15 to 44 degrees, −15 to −44 degrees, 46 to 75 degrees, and −46 to −75 degrees.

3. The method according to claim 1, further comprising:
    writing both the zig and the zag bursts with no phase shift value added to the write-clock.

4. The method according to claim 1, further comprising:
    specifying a phase shift value for each of the zig and/or the zag burst via a phase register; and
    writing the zig and the zag bursts with the corresponding phase shift values specified by the phase register added to the frequency register.

5. The method according to claim 4, further comprising:
    advancing or delaying the phase of the zig and/or the zag burst by the specified phase shift value.

6. The method according to claim 4, further comprising:
    reversing the phase of the zig and/or the zag burst back to the value before the phase shifting.

7. The method according to claim 1, further comprising:
    setting the write-clock to be at a frequency of at least 4 times the frequency of the phase-burst pattern.

8. The method according to claim 1, further comprising:
    writing the first half of the zig burst and the first half of the zag burst in one revolution; and
    writing the second half of the zig burst and the second half of the zag burst in another revolution.

9. The method according to claim 8, further comprising:
    averaging the difference between the phases of the first half of the zig and the zag bursts and the second half of the zig and the zag bursts.

10. A method for phase-burst servowriting, comprising:
    positioning a read/write head relative to a surface of a rotatable medium;
    servowriting a phase-burst pattern on the surface of the rotatable medium in one or more servowriting steps, wherein each servowriting step can include one or more revolutions, and the phase-burst pattern can include both digital information and one or more zig/zag bursts; and
    at each of the one or more revolutions:
        writing both a zig and a zag burst of the one or more zig/zag bursts and/or the digital information at edges of an integer cycle of a write clock; and
        shifting the phase of the write clock once by half clock cycle.

11. The method according to claim 10, further comprising:
    running the write clock at a frequency of one of 4 and 8 times the sinewave frequency of the one or more zig/zag bursts.

12. The method according to claim 10, further comprising:
    writing digital information at every other servowriting step of the one or more servowriting steps.

13. The method according to claim 10, further comprising:
    delaying or advancing the phase of the zig burst in the one or more zig/zag bursts by half a cycle of the write clock; and
    advancing or delaying the phase of the zag burst in the one or more zig/zag bursts by half a cycle of the write clock.

14. The method according to claim 10, further comprising:
    keeping the phase difference between the zig and zag bursts written during any of the one or more revolutions at an integer number of write clock cycles.

15. The method according to claim 10, further comprising:
    writing the one or more zig/zag bursts and/or the digital information to share the same coherence error at each of the one or more revolutions.

16. A system for writing phase-burst servo patterns, comprising:
    a rotatable medium including a surface having a plurality of servo tracks operable to store a phase-burst servo pattern that can include both digital information and one or more zig/zag bursts;
    a read/write head operable to write the one or more wedges; and
    one or more controllers operable to:
        position a read/write head relative to a surface of a rotatable medium;
        servowrite the phase-burst pattern on the surface of the rotatable medium in one or more revolutions via the read/write head; and
        at each of the one or more revolutions, perform at least one of:
            writing both a zig and a zag burst of the one or more zig/zag bursts together with the phase of the zig and/or the zag burst delayed or advanced by any degree relative to a write-clock; and
            writing the digital information with correct phase of the write clock.

17. The system according to claim 16, wherein:
the rotatable medium can be a magnetic disk, an optical disk, laser-recordable disk, a disk in a single and/or multi-headed disk drive, or a rotating data storage device.

18. The system according to claim 16, further comprising:
a phase integrator operable to update the write-clock at each of the one or more revolutions by adding or subtracting a phase shift value from the write clock.

19. The system according to claim 18, further comprising at least one of:
a frequency register operable to generate a stable base clock;
a phase register operable to specify the phase shift value to be either added to or subtracted from the phase of the write clock; and
a multiplexer operable to select between the value from either the frequency register or the phase register to be integrated with the value of the phase integrator.

20. A system for phase-burst servowriting, comprising:
a rotatable medium including a surface having a plurality of servo tracks operable to store a phase-burst servo pattern that can include both digital information and one or more zig/zag bursts;
a read/write head operable to write the one or more wedges; and
one or more controllers operable to:
position a read/write head relative to a surface of a rotatable medium;
servowrite the phase-burst pattern on the surface of the rotatable medium in one or more servowriting steps via the read/write head, wherein each servowriting step can include one or more revolutions; and
at each of the one or more revolutions:
write each of the one or more zig/zag bursts and/or the digital information at edge of an integer cycle of a write clock; and
shift the phase of the write clock once by half a cycle.

* * * * *

UNITED STATES PATENT AND TRADEMARK OFFICE
CERTIFICATE OF CORRECTION

| | | |
|---|---|---|
| PATENT NO. | : 7,110,209 B2 | Page 1 of 1 |
| APPLICATION NO. | : 11/090607 | |
| DATED | : September 29, 2006 | |
| INVENTOR(S) | : Richard M. Ehrlich et al. | |

It is certified that error appears in the above-identified patent and that said Letters Patent is hereby corrected as shown below:

In the Drawings:
Sheet 19 consisting of Fig. 19, at Step 1905, delete "oriignal phase" and insert -- original phase--.

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,110,209 B2 |
| APPLICATION NO. | : 11/090607 |
| DATED | : September 19, 2006 |
| INVENTOR(S) | : Richard M. Ehrlich et al. |

It is certified that error appears in the above-identified patent and that said Letters Patent is hereby corrected as shown below:

In the Drawings:
Sheet 19 consisting of Fig. 19, at Step 1905, delete "oriignal phase" and insert
-- original phase--.

This certificate supersedes Certificate of Correction issued December 19, 2006.

Signed and Sealed this

Thirtieth Day of January, 2007

JON W. DUDAS
*Director of the United States Patent and Trademark Office*